United States Patent [19]
Taube

[11] Patent Number: 5,899,219
[45] Date of Patent: May 4, 1999

[54] RATIO MIXING VALVE AND METHOD FOR CONTROLLING DITHER IN SAME

[75] Inventor: John D. Taube, Rochester Hills, Mich.

[73] Assignee: W. A. Kates Company, Clawson, Mich.

[21] Appl. No.: 08/726,834

[22] Filed: Oct. 8, 1996

[51] Int. Cl.[6] .................................................. G05D 11/13
[52] U.S. Cl. ................................. 137/7; 137/9; 137/100; 137/624.14; 137/624.15
[58] Field of Search ........................ 137/98, 100, 624.14, 137/624.13, 624.15, 7, 9; 251/50, 51

[56] References Cited

U.S. PATENT DOCUMENTS

| | | | |
|---|---|---|---|
| 962,111 | 6/1910 | Assmann | 137/100 |
| 2,379,483 | 7/1945 | Hapgood | 137/103 |
| 2,808,848 | 10/1957 | Cooper | 137/100 |
| 3,504,692 | 4/1970 | Goldstein | 137/624.14 |
| 3,722,526 | 3/1973 | Henningsson | 251/50 |
| 3,752,176 | 8/1973 | King | 137/100 |
| 3,920,216 | 11/1975 | Barnum | 251/51 |
| 3,996,956 | 12/1976 | Taft | 137/624.14 |
| 4,469,121 | 9/1984 | Moen | 137/100 |
| 4,471,797 | 9/1984 | Cass | 137/100 |
| 4,924,900 | 5/1990 | Taube, Sr. et al. | 137/101 |
| 5,395,350 | 3/1995 | Summers | 137/103 X |

OTHER PUBLICATIONS

Hydraulic and Pneumatic Power For Production Author: Harry L. Stewart p. 26–5 Copyright 1977.

*Primary Examiner*—Stephen M. Hepperle
*Assistant Examiner*—Ramyar Farid
*Attorney, Agent, or Firm*—Charles W. Chandler

[57] ABSTRACT

A ratio mixing valve for mixing first and second fluids in a constant volumetric ratio regardless of variations of supply pressures of the two fluids. The valve has an inlet passage for the first fluid that passes through a spool valve chamber, and an inlet passage for the second fluid that also passes through the spool valve chamber. Vent passages connect the two fluid passages to the ends of the spool valve chamber. The spool valve has a pair of annular grooves aligned with the two inlet passages. One groove partially blocks one of the inlet passages to form a variable orifice that responds to pressure changes in the incoming fluids by moving the spool valve to a position which adjusts the volumetric flow through the two passages to maintain a constant ratio between the fluids in the mixture.

8 Claims, 3 Drawing Sheets

RATIO MIXING VALVE AND METHOD FOR CONTROLLING DITHER IN SAME

BACKGROUND AND SUMMARY OF THE INVENTION

This invention is related to flow control valves for mixing two fluids, and more specifically to such a valve in which a spool is moved to positions in response to changing inlet fluid pressures to maintain a constant ratio of the two fluids in the mixture.

An example of such an application includes mixing a solvent with compressed air.

A similar valve was disclosed in U.S. Pat. No. 4,924,900 which was issued May 15, 1990 to Frank A. Taube, Sr. and Edward J. Rozniecki in which a spool was mounted in a flow regulator in such a manner that two fluids could be mixed in a predetermined ratio and the ratio maintained regardless of variations in the incoming fluid pressures. The spool forms a variable orifice for passing one of the fluids, and maintains a stable position when the two fluid pressures are balanced at opposite ends of the spool. The orifice opening depends on the incoming fluid pressures. When one of the pressures is increased or reduced, the pressure imbalance moves the spool to a different balanced position, thereby enlarging or reducing the variable orifice opening so that the volumetric ratio of the two fluids in the mixture remains constant.

This invention represents an improvement over the ratio mixing valve disclosed in the '900 patent by providing a more compact device. In the preferred embodiment, both incoming fluids pass through the spool valve chamber. The spool has annular grooves for passing the two fluids through the chamber. One groove is sufficiently wide that regardless of the spool's position, the first fluid volumetric flow or pressure remains the same. The other groove is disposed so that the spool partially blocks the passage of the second fluid, forming a variable orifice opening that reduces the pressure of the second fluid to that of the first fluid.

The means for adjusting the volumetric ratio of the fluid mix comprise a pair of needle valves that are mounted in the two fluid passages downstream of the spool chamber, adjacent a pair of discharge ports. The user adjusts the ratio of the two fluids in the mixture by adjusting the position of the two needle valves.

Still another advantage of the invention is that the dither may be optimized. Dither is the tendency of a spool valve to oscillate axially in the valve chamber when the spool is balanced between two fluid pressures. If the dither or oscillation is too high, the spool tends to chatter thereby reducing its life. On the other hand, if the dither is too low, the spool tends to stick in the valve chamber thereby creating hysterisis and creating an error of inlet pressure and therefor a ratio error.

Although dither can occur in a liquid/liquid or a gas/gas system, dither may be most objectionable in a valve that mixes a gas with a liquid because the liquid is relatively incompressible while the gas is compressible.

I have found that the amount of dither can be optimized by controlling the diameter of the vent passages connecting the primary fluid passages to the ends of the spool valve chamber. Changing the vent hole size changes the time required for the spool to sense a fluid pressure change. Controlling the vent hole size, controls the sensing time, which controls the speed and duration of the oscillation. Controlling the vent hole size can maximize or eliminate oscillation. However, some oscillation is desirable because it creates a chopping action which is desirable when the output is used in a cleaning system, such as paint lines.

Initially the valve body is formed with vent passages of a certain diameter. Fluids are then passed through the valve. A flow meter is connected to the discharge or mixing passage to sense flow fluctuations of the mixture. The flow meter needle fluctuates in accordance with the oscillation of the spool.

If the dither is unacceptable, then at the least one of the vent passages is enlarged or reduced. The flow meter is used again to sense fluctuations in the flow of the mixture. When the flow fluctuations are acceptable then the degree of dither is accepted.

Another method is to introduce a needle valve into the vent passage to adjust the rate of sensing the pressure changes thereby controlling the amplitude of the dither or oscillation.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
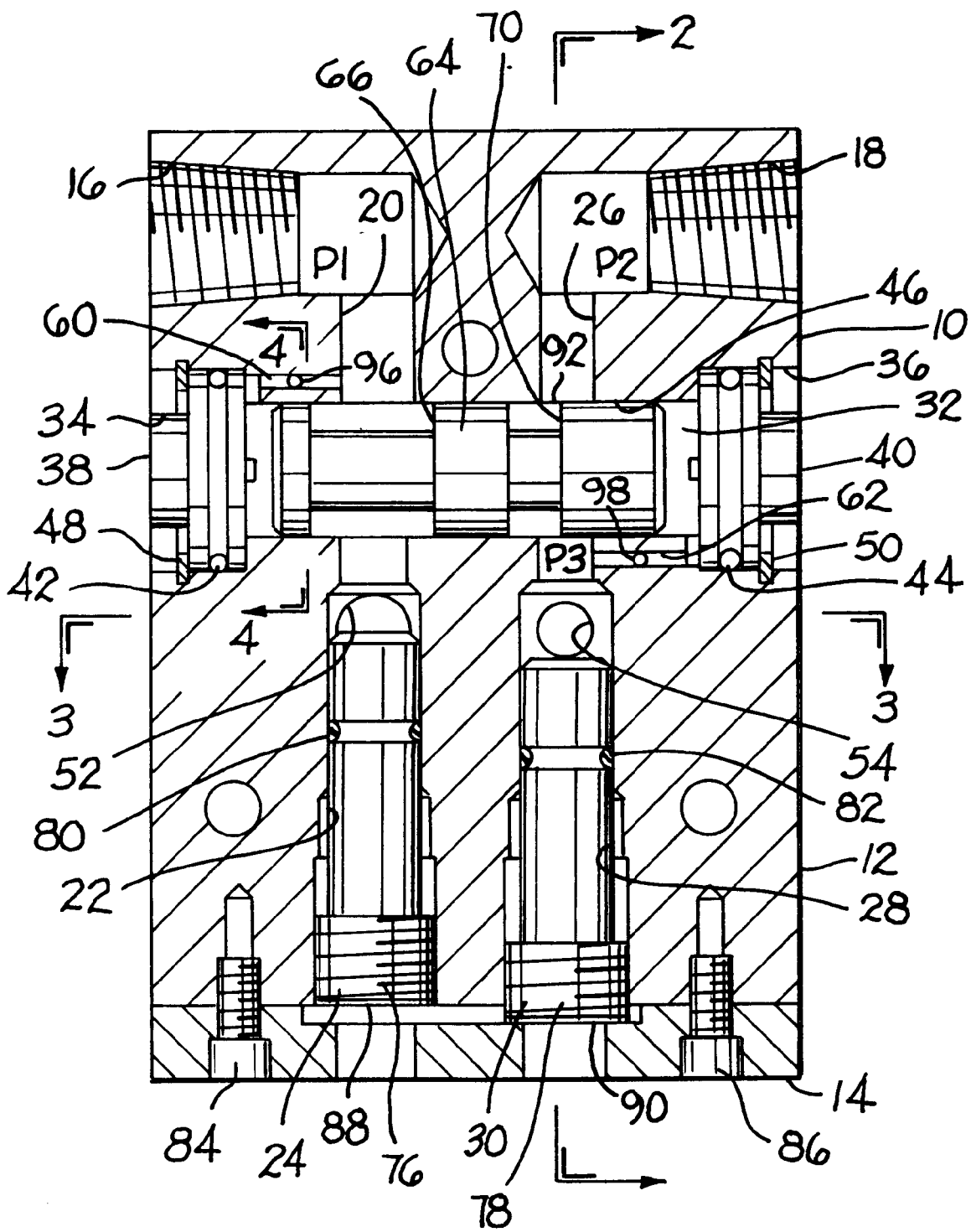
FIG. 1 is a sectional view of a ratio mixing valve illustrating the invention.

Referring to the drawings, FIG. 1 illustrates a preferred ratio mixing valve 10 which comprises a body 12 having a lower needle valve plate 14. Body 12 has inlet ports 16 and 18 for receiving first and second fluids which are to be mixed in a predetermined ratio. The two inlet ports are internally threaded for connection to suitable supply lines (not shown) for receiving the respective fluids from pressurized sources.

Inlet port 16 is fluidly connected to a fluid passage 20 which extends downwardly and is aligned with a lower needle valve passage 22. The lower end of the needle valve passage is internally threaded at 24. Needle valve passage 22 has a slightly larger diameter than fluid passage 20.

Inlet port 18 is fluidly connected with a fluid passage 26 which is parallel to and smaller in diameter than fluid passage 20. Fluid passage 26 extends to a second needle valve passage 28 which is also parallel to needle valve passage 22. Needle valve passage 28 has the same diameter as needle valve passage 22. The lower end of needle valve passage 28 is internally threaded at 30.

A transverse cylindrical bore 32 is disposed at right angles to and intersects the two fluid passages. Bore 32 has enlarged end openings 34 and 36. A pair of end caps 38 and 40 are mounted in end openings 34 and 36, respectfully. A pair of "O" rings 42 and 44, respectively, maintain a fluid-tight seal between end caps 38 and 40 and the bore. The end caps form the ends of a cylindrical spool valve chamber 46. Retaining rings 48 and 50 lock the two end caps in position.

The spool valve chamber is aligned with the two fluid passages so that a first fluid can pass downwardly, as viewed in FIG. 1, from inlet port 16 through passage 20, into passage 22 and out a discharge passage 52. Similarly, a second fluid can pass through inlet port 18, pass down through passage 26, into passage 28 and out a second discharge passage 54. Passage 54 has a smaller diameter than passage 52, but this size variance is not mandatory.

Referring to FIG. 1, a small vent passage 60 fluidly connects fluid passage 20 upstream of the spool valve chamber to one end of the spool valve chamber. A second small vent passage 62 fluidly connects fluid passage 26 downstream of the spool valve with the opposite end of the spool valve chamber. A spool valve 64 is slideably mounted in the spool valve chamber. The fluid pressure at one end of the fluid valve chamber urges the spool valve in one direction while the fluid pressure in the opposite end of the chamber urges the spool valve in the opposite direction.

The spool valve has two spaced annular grooves 66 and 70. Groove 66 is aligned with fluid passage 20 and has a length greater than the diameter of passage 20 so that the spool valve will not obstruct fluid flowing from passage 20 through the spool valve chamber toward discharge passage 52. The two end faces of the spool have identical circular cross sections.

Groove 70 has a much shorter length than groove 66 and is disposed in such a position that the spool valve partially blocks fluid flowing through passage 26 toward discharge passage 54, thereby forming a variable orifice opening. The orifice opening size depends upon the axial position of the spool valve in the spool valve chamber. By moving the spool valve toward the left, the orifice opening is reduced, moving the spool valve to the right enlarges the orifice opening.

Figure 2:
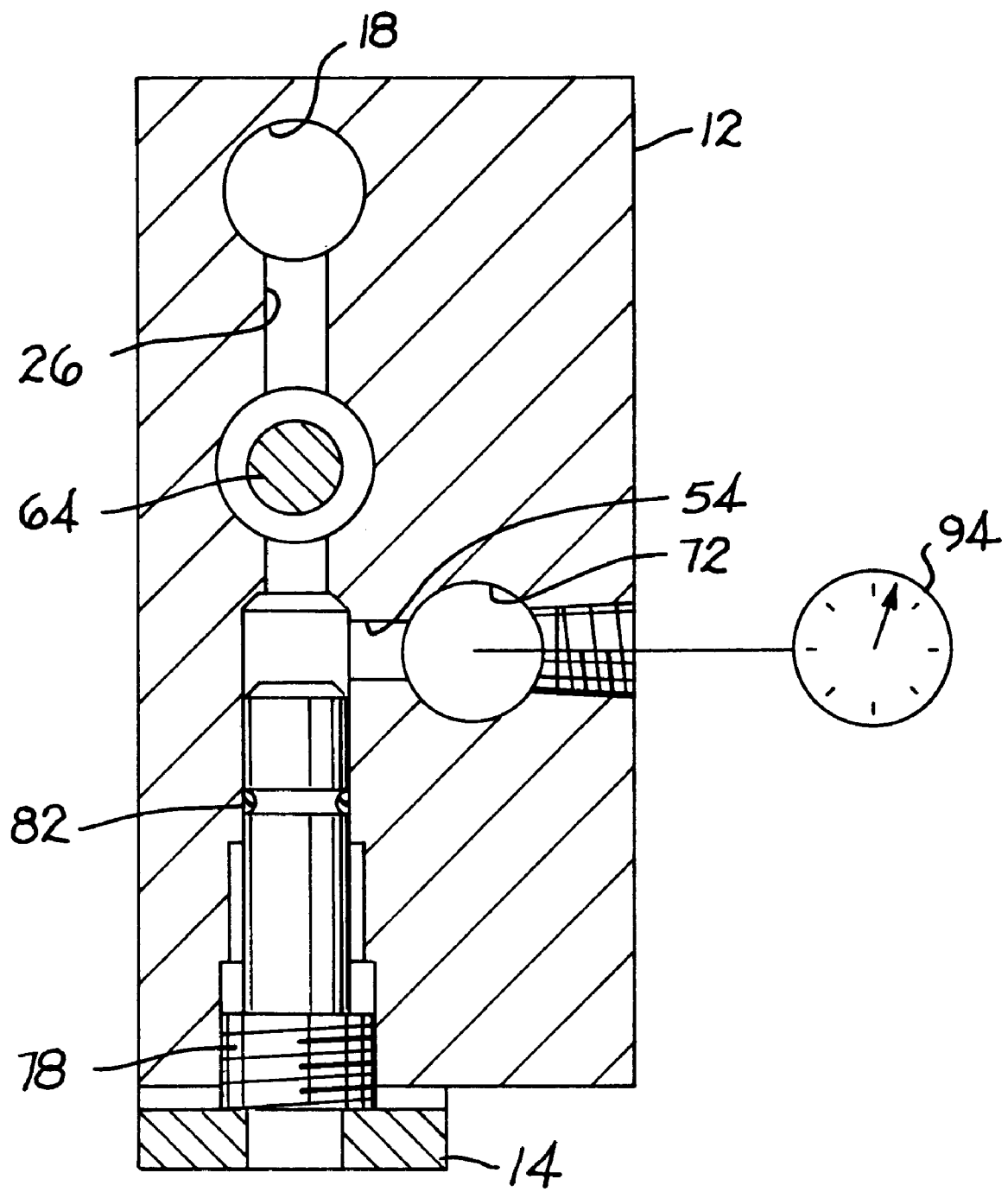
FIG. 2 is a view generally taken along lines 2—2 of FIG. 1.
Figure 3:
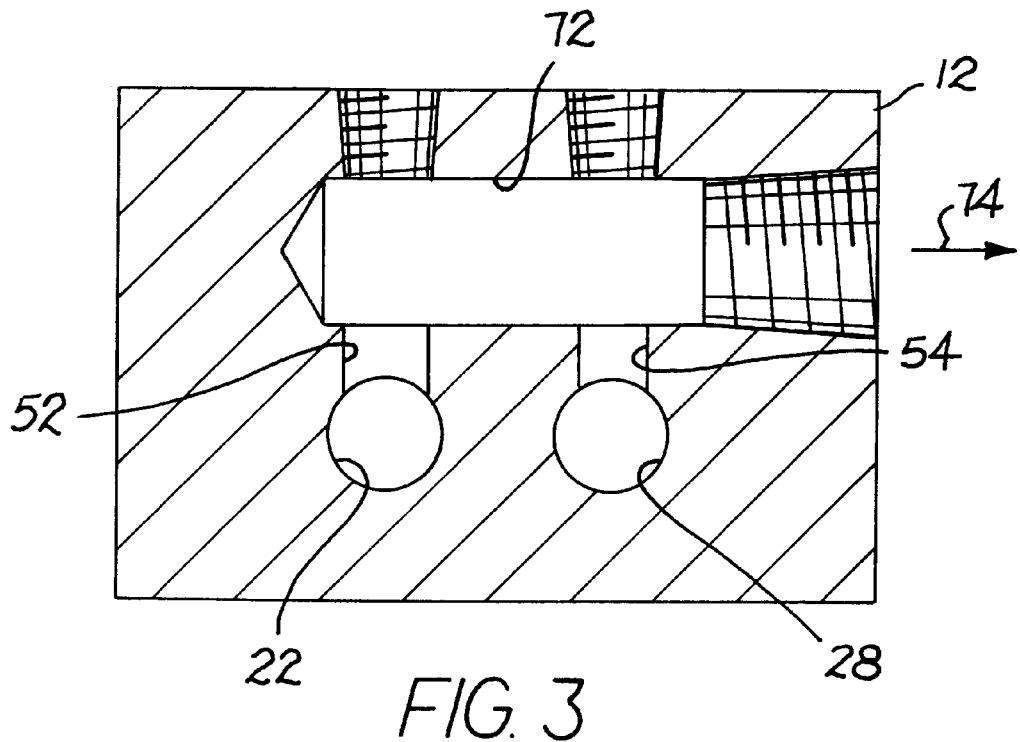
FIG. 3 is a view generally as seen along lines 3—3 of FIG. 1.

Referring to FIGS. 2 and 3, discharge passages 52 and 54 are fluidly connected with a mixing passage 72. The fluid mixture flows out of the mixing passage in the direction of arrow 74 through any suitable conduit.

Referring to FIG. 1, needle valve 76 is threadably mounted in the lower end of passage 22. A second needle valve 78 is threadably mounted in the lower end of passage 28. An "O" ring 82 forms a fluid-tight connection between needle valve 76 and the body while a second "O" ring forms a fluid tight connection between needle valve 78 and the body. The upper end of needle valve 76 is threadably adjusted either toward or away from discharge passage 52 to control the volume of fluid passing to the mixing passage. Similarly, needle valve 78 is threadably adjusted either toward or away from passage 54 to adjust the amount of fluid passing to the mixing passage. In this way the two needle valves can be adjusted to determine the ratio of the two fluids in the final mixture.

Needle valve plate 14 is attached to the lower end of the body by a pair of socket head cap screws 84 and 86. The needle valve plate prevents the two needle valves from being fully unscrewed from their respective positions, which would allow ejection under pressure. The two needle valves have a pair of slots 88 and 90 to permit the user to employ a screwdriver for rotating the two needle valves toward their adjusted positions.

In operation, first and second pressurized fluids that are to be mixed, are supplied to inlet openings 16 and 18 at pressures $P_1$ and $P_2$, respectively. Passage 20 delivers the first fluid to the spool valve chamber. Vent 60 delivers the first fluid to the left end of the spool valve chamber where pressure $P_1$ urges the spool towards the right.

The second fluid entering inlet opening 18 at pressure $P_2$ is delivered down toward passage 54 through passage 26. The second fluid is conducted through vent 62 toward the right end of the spool valve chamber where it urges the spool valve toward the left. As the second fluid passes through the variable orifice opening designated at 92, a pressure drop occurs and hence the second fluid in the spool valve chamber and vent 62 will have a pressure $P_3$ less than pressure $P_2$. Whenever pressure $P_1$, and pressure $P_3$ are not equal, the spool valve will move toward the lower of the two pressures. This movement will in turn change the area of orifice opening 92 and hence the pressure drop across the variable orifice until an equilibrium is reached in which $P_1$ equals $P_3$. In the event the inlet pressure of either or both fluids should change, the spool valve will be moved to a new position whereby the variable orifice opening modulates the pressure drop such that $P_3$ again equals $P_1$.

Referring to FIGS. 1 and 3, when the regulator body is being manufactured, a flow meter 94 is connected to the mixing passage to sense the oscillations of the spool valve referred to as dither. If the oscillations of the spool valve are not acceptable, preferably vent 60 is drilled to a slightly larger size to reduce the dither, and the mixture flow fluctuations noted. If the dither is then satisfactory, subsequent valves are drilled with a similarly size vent 60. The dither can also be controlled by progressively increasing the diameter of vent 62.

Figure 4:
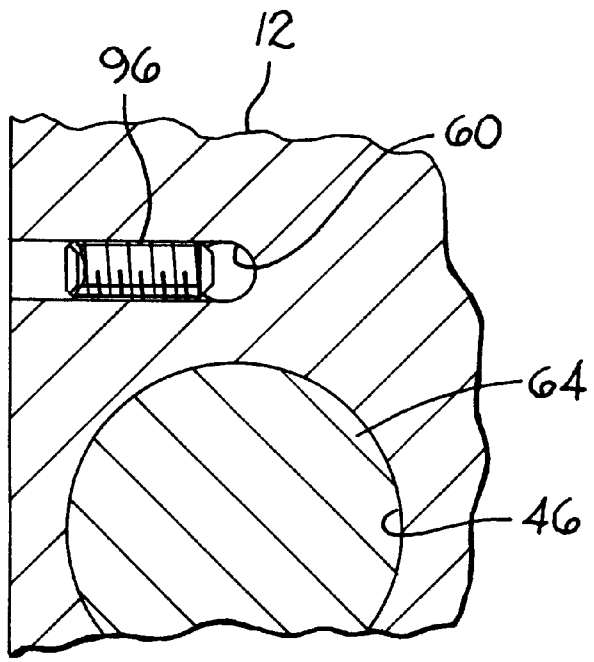
FIG. 4 is an enlarged fragmentary sectional view as seen along lines 4—4 of FIG. 1.

Referring to FIGS. 1 and 4, a pair of needle valves 96 and 98 are mounted in tapped openings in body 12 which intersect vent passages 60 and 62, respectively. Each of the two needle valves may be adjusted to reduce the size of their respective passages to reduce the fluid flow by creating a restriction.

Although vent 62 is shown in the downstream side of the valve chamber, vent 60 could also be formed on the downstream side of the valve chamber to connect passage 20 with its end of the spool valve chamber.

Having described my invention, I claim:

1. A method for moving a spool valve having first and second openings and which is reciprocally moveable in an elongated spool valve chamber having a first end and a second end, in a dither motion, comprising the steps of:

(a) introducing a first fluid at a first inlet pressure through the first opening in the spool valve in the spool valve chamber;

(b) fluidly connecting the first fluid with the first end of the spool valve chamber through a first vent passage means such that the fluid pressure in the first end of the spool valve chamber biases the spool valve in a first direction;

(c) passing the first fluid from the spool valve chamber;

(d) introducing a second fluid at a second, higher inlet pressure through the second opening in the spool valve in the spool valve chamber;

(e) fluidly connecting the second fluid downstream of the second opening in the spool valve with the second end of the spool valve chamber through a second vent passage means such that the fluid pressure in the second end of the spool valve chamber biases the spool valve in a second direction, opposite to said first direction, to oscillate and cause the spool valve to throttle the higher pressure of the second fluid flowing through the second opening of the spool valve;

(f) passing the second fluid from the spool valve chamber and mixing the first fluid and the second fluid in a mixture having flow fluctuations caused by the oscillations of the spool valve;

(g) sensing the flow fluctuations of the fluid mixture downstream of the spool valve chamber;

(h) changing the fluid passage through at least one of the vent passage means to change the spool valve oscillation motion; and (I) repeating steps (g) and (h) until the spool valve oscillates in a continuous dither.

2. In a ratio mixing valve for mixing a first fluid supplied at a first pressure with a second fluid supplied at a second pressure higher than said first pressure together in a predetermined ratio, including:

a body having a spool valve chamber having first and second ends;

a first fluid inlet opening for receiving a first fluid and fluidly connected with said chamber;

a second fluid inlet opening for receiving a second fluid and fluidly connected with said chamber;

a mixing passage for receiving and mixing the first and second fluids from the spool valve chamber;

a spool valve slidably disposed in the spool valve chamber, including means defining a variable orifice between the spool valve and the body in the path of fluid flow from the second fluid inlet opening;

first vent passage means fluidly connecting fluid from the first fluid inlet opening to the first end of the spool valve chamber to urge the spool valve in a first direction;

second vent passage means fluidly connecting fluid from the second fluid inlet opening to the second end of said spool valve chamber downstream of the variable orifice whereby the pressure of the first fluid urges the spool valve in a first direction to increase the size of the variable orifice and the pressure of the second fluid urges the spool valve in the opposite direction to reduce the size of the variable orifice, the variable orifice thereby maintaining a predetermined ratio between the flow rates of the first fluid and the second fluid to the mixing passage means regardless of relative changes in the supplied pressures of the first fluid and the second fluid, the improvement comprising;

a first passage means for passing the first fluid through the spool valve chamber from the first fluid inlet to the mixing passage;

a second passage means for passing the second fluid through the spool valve chamber from the second inlet opening to the mixing passage;

the spool valve having a first opening aligned with the first passage means for passing the first fluid through the spool valve chamber, and a second opening aligned with the second passage means for passing the second fluid through the spool valve chamber, the second opening overlapping the second passage means to define the variable orifice opening for changing the pressure of the second fluid depending upon the position of the spool valve in the spool valve chamber;

a first needle valve threadably disposed in the first passage means to adjust the volume of fluid passing from the first passage means to the mixing passage, and a second needle valve threadably adjustable in the second passage means to adjust the volume of flow of fluid passing from the second passage means to the mixing passage;

at least one of the vent passage means being formed by the steps of:

forming an elongated vent passage of a first diameter between the first passage means and the spool valve chamber, and then sensing at least one of the fluids downstream of the spool valve chamber to determine oscillations in the fluid flow reflecting oscillations of the spool valve, and then either reducing or enlarging the vent passage diameter and sensing the flow oscillations downstream of the spool valve chamber until a desired spool valve oscillation is maintained; and in which the pressure oscillations are sensed in the fluid in the mixing passage.

3. The improvement as defined in claim 2, in which the first opening of the spool valve comprises a first annular groove aligned with the first passage means, and the second opening in the spool valve comprises a second annular groove aligned with the second passage means.

4. The improvement as defined in claim 2, in which the spool valve chamber is elongated and the first and second passage means are parallel to one another and intersect the spool valve chamber at right angles to the longitudinal axis of the spool valve chamber.

5. A ratio mixing valve as defined in claim 2, in which the oscillations are achieved independently of any electrical signals acting on the spool valve.

6. A ratio mixing valve as defined in claim 2, in which the amplitude of spool motion caused by said oscillations are caused solely by fluid passing through the variable orifice.

7. An improvement in a ratio mixing valve as defined in claim 2, in which one of the fluids is a liquid and the other of the fluids is a gas.

8. An improvement in a ratio mixing valve as defined in claim 2, in which one of the fluids is a solvent and the other of the fluids is compressed air.

* * * * *